Sept. 30, 1947.   E. T. PLATZ   2,428,320
PANELBOARD OF DETACHABLY MOUNTED ELECTRICAL DEVICES
Filed July 24, 1942   2 Sheets-Sheet 1

INVENTOR.
ELWOOD T. PLATZ
BY
*Daniel G. Cullen*
ATTORNEY.

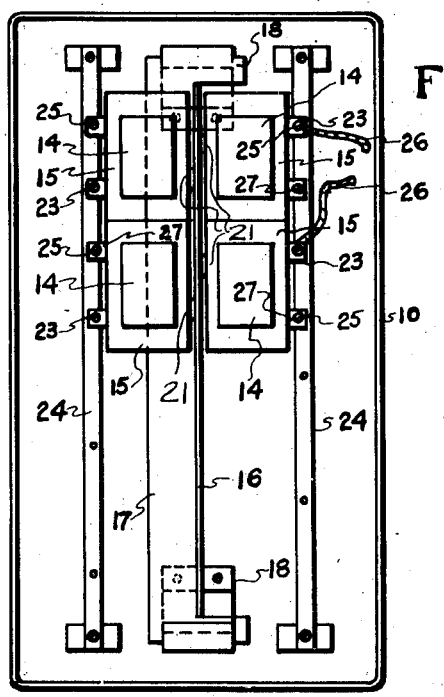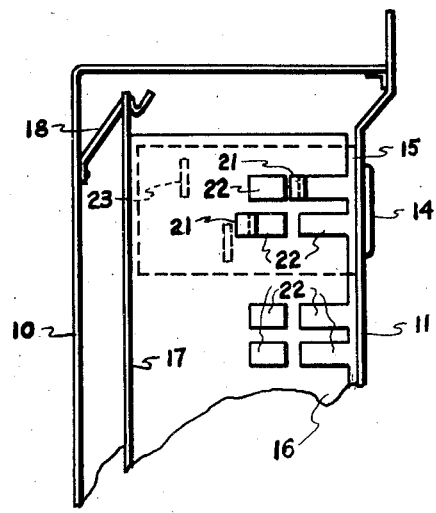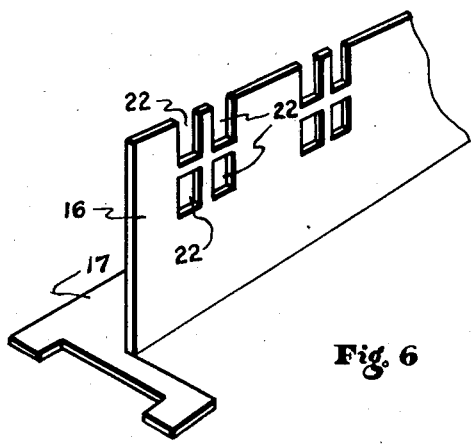

Patented Sept. 30, 1947

2,428,320

UNITED STATES PATENT OFFICE 2,428,320

PANELBOARD OF DETACHABLY MOUNTED ELECTRICAL DEVICES

Elwood T. Platz, Detroit, Mich., assignor to Bulldog Electric Products Company, Detroit, Mich., a corporation of West Virginia Application July 24, 1942, Serial No. 452,128

6 Claims. (Cl. 175—308)

This application relates to panelboards and more particularly to mounting arrangements for switches or the like.

For an understanding of the panelboards herein disclosed, reference should be had to the appended drawings.

In these drawings,

Fig. 4 is a front view of the panelboard with the cover completely removed.

Fig. 5 is a fragmentary side section of Fig. 4.

Fig. 6 is a detailed view of the mounting plate of the panelboard.

Figure 1:
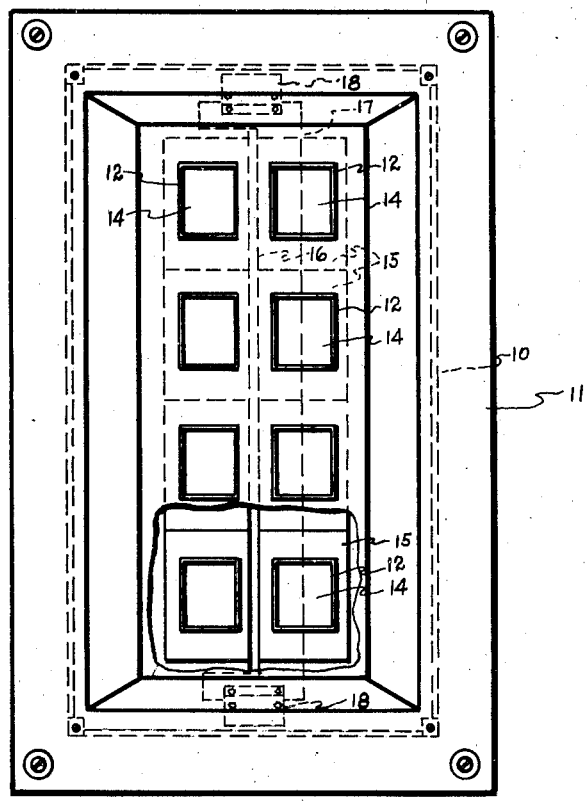
Fig. 1 shows a panelboard with the front cover thereof partly cut away to expose the front surfaces of switch devices therein.
Figure 2:
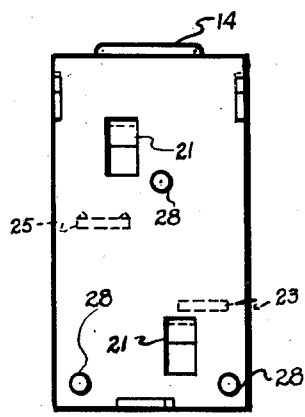
Fig. 2 is a back view of one of the devices.
Figure 3:
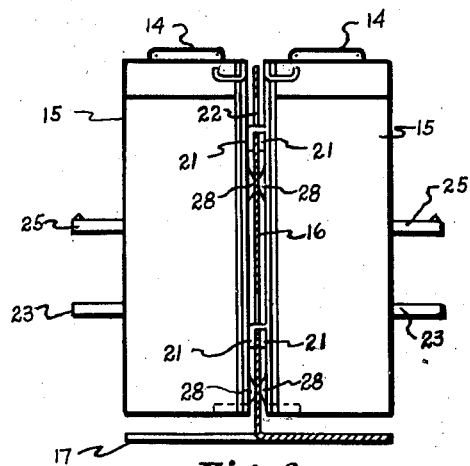
Fig. 3 shows two devices, back to back.

Figs. 1-6 of the drawings show a panelboard consisting of a box 10 whose front open surface is covered by a front cover 11, having numerous small openings 12 through which may forwardly project the push type actuators or handles or push buttons 14 of the switching devices 15, mounted on the forwardly projecting portion 16 of a mounting plate 17 in turn mounted on spring supports 18, fastened to the back of the box 10.

The arrangement herein disclosed for mounting in a box the mounting plate 17 is similar to the arrangement shown in Patent No. 2,261,987 of November 11, 1941, for mounting a mounting plate in a box.

The devices themselves are in the nature of switches, having forwardly accessible push type actuators, in the nature of push buttons which are pushed successively from the front surface of the panelboard for actuation of the switch mechanism. The details of the switch mechanism are not herein disclosed because that is of no importance in this application; it is sufficient to observe that actuation of such mechanism is accomplished simply by pushing of the push buttons 14 from the front surface of the panelboard, the buttons being exposed through the holes 12 of the cover 11.

For mounting the devices on the mounting plate, the arrangement now to be described has been provided. The mounting plate has a plate-like portion 16 which projects towards the cover 11 so that its edge is forwardly exposed. Two rows of devices are arranged, one on each side of the portion 16, with the devices themselves being aligned, back to back, against opposed sides of the plate, in pairs. At diagonally opposed corners of each of the devices are hooks 21, these being cut out and bent from the metal plates which form the backs of the devices. The hooks dispose themselves in similarly located holes 22 formed in the portion 16. Certain of these holes have edges coinciding with the forward edge of the portion 16 so as to be in the nature of slots, and they might also have been formed as keyhole slots if desired. For each two devices there are two pairs of hooks and holes. The hooks and holes for one device define a line which intersects the line connecting the hooks and holes for the other device. This is so because the devices are identical and their hook and hole arrangements are identical.

The hooks are so arranged that the push on the actuator 14 for each device tends to push that actuator away from the front of the panel and thus enhances the grip of the hooks and the plate.

In addition, the hooks of one of the devices of the pair engages the back of the device paired to it and biases that device away from the portion 16 in order to enhance the grip of the hooks and the plate. This action is reciprocal, for in each pair of devices, the two devices are biased in opposite directions, away from the portion 16, and the grip of the hooks and the plate is thus enhanced. The cooperation of the two devices, back to back, is of course essential to create this characteristic.

The devices may be assembled or mounted on a portion 16 simply by moving the devices laterally to portion 16 so that hooks 21 enter holes 22, and then pushing the devices towards the back of the panel.

Projecting laterally from the fronts of the devices are line terminals 23 connected to line bus bars 24, and load terminals 25 connected to load conductor terminals 26, by screws 27 having front exposed heads.

Each device has embossments or spacers 28 on its back to cooperate with the plate portion 16 and hooks 21 for tightly securing the devices on the plate.

Now having described the panelboard herein disclosed, reference should be had to the claims which follow.

I claim:

1. A mounting arrangement including a thin mounting plate, two rows of devices, one on each side of the plate, with the devices being alined and side by side against opposed sides of the plate, hooks on the sides of the devices projecting well beyond and through holes of the plate and located in such a manner that identically located hooks of various identical devices will not interfere or meet when two identical devices are placed side by side, the plate having two holes for the two hooks of the two devices, the hook of one device engaging the side of the device paired thereto and biasing that device away from the plate to enhance the grip of the hooks on the plate.

2. A panelboard comprising a box having a vertical back, vertical sides, horizontal top and bottom walls, and an open front, a mounting plate therein arranged to extend vertically, running from near the top to near the bottom of the box, parallel to the sides, with its rear edge near the back of the box, and switching devices disposed on and against the opposite sides of the plate and secured thereto, each device having, in relation to the box, two vertical sides, one of which has means for mounting it against the plate, and having an exposed front, and manual operating means on the exposed front of each device, the devices and the mounting plate having cooperating interengaging formations of a character that interengage, to mount the devices on the plate, merely by pushing the devices rearwardly of the plate, when they are against the plate.

3. In a panelboard, a box having a back, sides, ends, and an open front, a thin mounting plate fixedly mounted in said box and arranged parallel to the sides thereof and perpendicular to the back and the ends so as to present a narrow thin edge to the front of the box, two rows of devices, one row on each side of the plate, the devices and the mounting plate having cooperating interengaging formations of a character that interengage, to mount the devices on the plate, merely by pushing the devices rearwardly of the plate, when they are against the plate.

4. A panelboard comprising vertically extending bus bar means, and a plurality of switches having front manipulable push button handles controlling them, with the switches and their handles being arranged in two closely adjacent vertical rows, the handles and switches being constructed and arranged for independent operation for single pole switching, the bus bar means being outside of the handles so that the handles are between the bus bar means, whereby the vertical rows of handles are close enough together so that two adjacent handles of one horizontal line across the panelboard, one from each vertical row, may be pushed in simultaneously by hand for two pole switching.

5. A panelboard comprising vertically extending bus bar means, and a plurality of switches having front manipulable push button handles controlling them, with the switches and their handles being arranged in two closely adjacent vertical rows, the handles and switches being constructed and arranged for independent operation for single pole switching, the bus bar means being outside of the handles so that the handles are between the bus bar means, whereby the vertical rows of handles are close enough together so that two adjacent handles of one horizontal line across the panelboard, one from each vertical row, may be pushed in simultaneously by hand for two pole switching, the panelboard including a thin vertically extending mounting plate arranged perpendicular to the panelboard back and ends and parallel to the panelboard sides and disposed between the two rows of switches, and with a narrow thin edge exposed to the front of the panelboard, the switches being mounted on opposite sides of such plate.

6. A panelboard comprising vertically extending bus bar means, and a plurality of switches having front manipulable push button handles controlling them, with the switches and their handles being arranged in two closely adjacent vertical rows, the handles and switches being constructed and arranged for independent operation for single pole switching, the bus bar means being outside of the handles so that the handles are between the bus bar means, whereby the vertical rows of handles are close enough together so that two adjacent handles of one horizontal line across the panelboard, one from each vertical row, may be pushed in simultaneously by hand for two pole switching, the panelboard including a thin vertically extending mounting plate arranged perpendicular to the panelboard back and ends and parallel to the panelboard sides and disposed between the two rows of switches, and with a narrow thin edge exposed to the front of the panelboard, the switches being mounted on opposite sides of such plate, the switches and the mounting plate having cooperating interengaging formations of a character that interengage, to mount the switches on the plate, merely by pushing the switches rearwardly of the plate, when they are against the plate.

ELWOOD T. PLATZ.

REFERENCES CITED

The following references are of record in the file of this patent:

UNITED STATES PATENTS

| Number | Name | Date |
|---|---|---|
| 1,271,641 | Werwath | July 9, 1918 |
| 1,937,935 | Zimmerman | Dec. 5, 1933 |
| 2,282,520 | Jackson | May 12, 1942 |
| 1,856,288 | Ogle | May 3, 1932 |
| 2,261,987 | Frank et al. | Nov. 11, 1941 |
| 1,426,921 | Smith | Aug. 22, 1922 |
| 2,183,872 | Rowe | Dec. 19, 1939 |
| 1,296,653 | Griswold | Mar. 11, 1919 |
| 1,369,622 | Condit | Feb. 22, 1921 |
| 2,174,669 | Sachs | Oct. 3, 1939 |
| 1,878,335 | Shull | Sept. 20, 1932 |
| 2,268,619 | Reid | Jan. 6, 1942 |
| 1,321,144 | Platt | Nov. 11, 1919 |

FOREIGN PATENTS

| Number | Country | Date |
|---|---|---|
| 222,045 | Great Britain | Sept. 25, 1924 |
| 450,326 | Great Britain | July 15, 1936 |